June 14, 1932.  J. D. TEAR  1,863,421
ELECTROMAGNETIC COMPASS
Filed Nov. 19, 1928
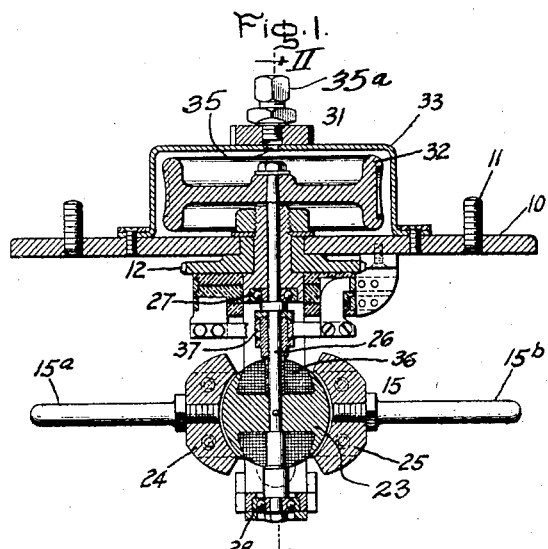
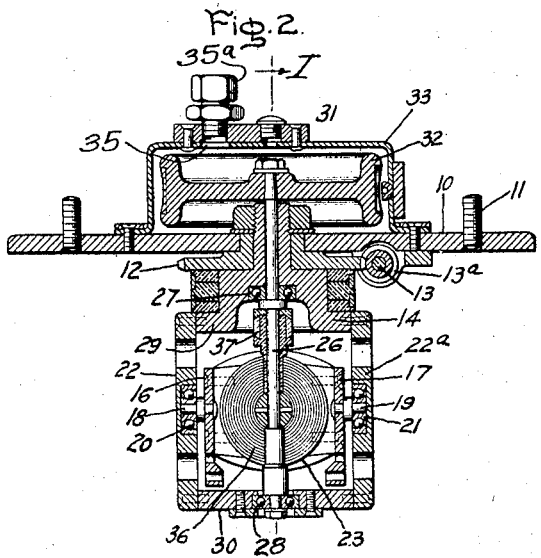
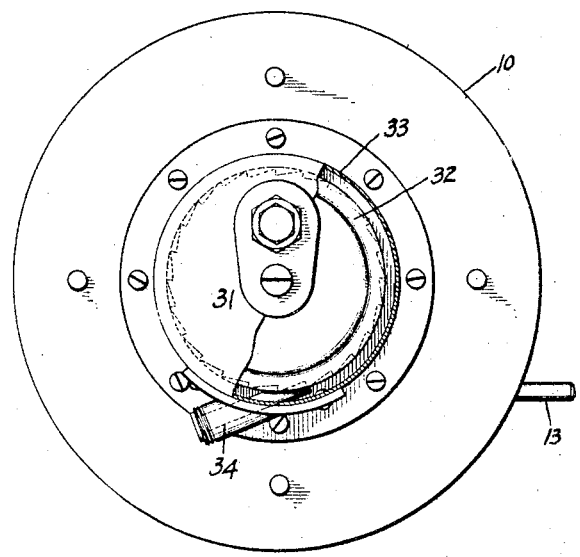
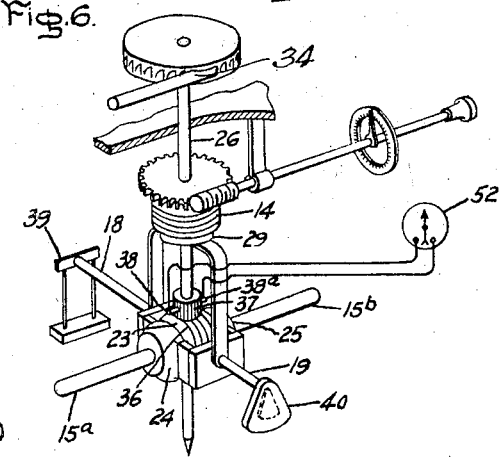
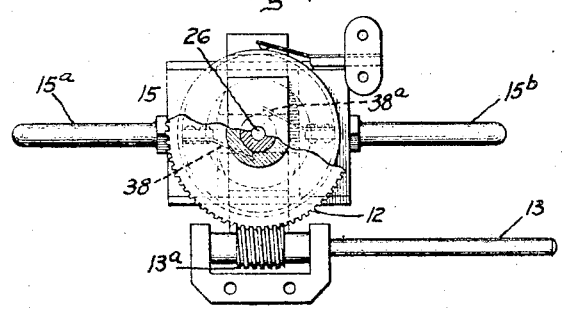
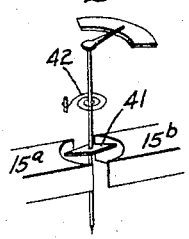
Inventor:
James D. Tear,
by Charles V. Tullar
His Attorney.

Patented June 14, 1932

1,863,421

UNITED STATES PATENT OFFICE

JAMES D. TEAR, OF SCHENECTADY, NEW YORK, ASSIGNOR TO GENERAL ELECTRIC COMPANY, A CORPORATION OF NEW YORK

ELECTROMAGNETIC COMPASS

Application filed November 19, 1928. Serial No. 320,239.

My invention relates to devices for indicating the relative angular position of a body with respect to the direction of a magnetic field, and more particularly to devices for indicating the angular position of ships, airplanes, or the like, with respect to the direction of the earth's magnetic field and has for an object the provision of a simple, sensitive, accurate and reliable device of this character.

This invention has general application in the navigation of ships where the well known mariner's magnetic compass is commonly used. It has particular application, however, to airplanes, the vibration and unstable flight conditions of which have been found seriously to affect the accuracy of indication of the magnetic compass.

In the past, devices have been used in the navigation of airplanes known as earth inductor compasses. Briefly, the earth inductor compass is composed of an inductor coil mounted on a shaft and adapted to be rotated about a vertical axis in the earth's magnetic field. Terminals of the coil are brought out to a commutator mounted on the shaft. A pair of brushes make contact with the commutator and are connected to a galvanometer. The brushes are fixedly mounted on the airplane but may be rotated about the vertical axis by a course setting device so that their axis will lie in an east-west plane when the airplane is on its chosen course, at which time the galvanometer will read zero. This device, although entirely operative, has certain disadvantages. If the brushes are imperfect or wear unevenly, errors will be introduced in the system and reflected in the galvanometer reading, for the accuracy of the reading is dependent upon the relative positions of the brush axis and the meridian of the magnetic field. Furthermore, the accuracy of the reading depends upon the axis of the inductor coil being maintained in a vertical position in order that errors shall not be introduced into the system by the vertical component of the earth's field. To this end the inductor coil is suspended as a pendulum and the connection to the driving means is made through a universal joint. Universal joints are not perfect and introduce errors in the stabilization of the coil and these errors show up in the galvanometer reading. It is a further object of my invention to provide an indicating device free from the defects and the disadvantages of the prior art devices.

This invention is an improvement of the compass provided with magnetic pole pieces described and claimed in a copending application of Frank Rieber, Serial No. 244,507, filed January 4, 1928 and assigned to the assignee of this invention.

In carrying out my invention in one form I provide an elongated ferro-magnetic member having its magnetic circuit interrupted intermediate its extremities to provide a spherical opening or air gap in which I mount a ball shaped armature having an axis fixed with respect to the airplane and arranged to be rotated by a suitable driving means. This magnetic member serves to intensify the flux due to the earth's magnetic field and to direct this intensified flux into the armature so that a voltage is induced therein dependent upon the angular position of the member in the earth's field. The ferro-magnetic member is mounted on the airplane or other support so that it is constrained to move with the airplane about a vertical axis and is stabilized in a horizontal plane under normal flight conditions, and means are provided for so orienting the member in a horizontal plane about a vertical axis that it will occupy an east-west plane when the airplane is on its chosen course and no flux will be caused to pass therethrough in a longitudinal direction by the earth's field. Deviation from the chosen course causes a flux to be induced in the ferromagnetic member and to cross the air gap in a direction dependent upon the direction of the deviation, and this condition is indicated by a sensitive indicating device connected with the rotating armature. The construction of the ferro-magnetic member is such that the armature member is effectually screened from all direct effect of the earth's magnetic field or any stray fields that may be present, to eliminate such errors as arise from these sources.

For a more complete understanding of my invention, reference should be had to the accampanying drawing in which Fig. 1 is a view of my electromagnetic compass in section taken on the line I—I of Fig. 2; Fig. 2 is an end section taken on the line II—II of Fig. 1; Fig. 3 is a plan view showing the supporting plate; Fig. 4 is a plan view with the supporting plate removed; Fig. 5 is a diagrammatic modification; and Fig. 6 is a diagrammatic illustration of the device shown in Fig. 1.

Referring now to the drawing, I have illustrated my invention in one form as adapted to be employed upon an airplane. The compass proper is supported by the supporting plate 10 which may be rigidly fastened to an overhead girder or beam in the cabin by the bolts 11. A worm gear wheel 12 is suitably journaled in the supporting plate 10 in the center thereof so that it may be freely rotated by turning a shaft 13 mounted on the supporting plate 10 and having attached thereto a worm 13a cooperating with the worm gear 12. A dependent, rectangular housing member 14 is secured to and carried by the rotatable gear wheel 12, and this housing member 14 itself serves to carry an elongated ferro-magnetic member 15 which is illustrated as being divided centrally into two separate members 15a and 15b to provide an air gap the form of which is preferably spherical. These two members, 15a and 15b, are fastened together in longitudinal alignment by the supporting plates 16 and 17 made of a suitable non-magnetic material such as brass. These plates are provided with protruding pivots 18 and 19 respectively which are journaled in bearings 20 and 21 secured centrally thereof to the upright arms 22 and 22a of the housing member 14 respectively, so that the elongated ferro-magnetic member 15 is free to rotate through a limited angle about a central horizontal axis perpendicular with its own longitudinal axis.

One of the purposes of the elongated members 15a, 15b is to direct the earth's field into a spherical shaped armature member 23 mounted between pole pieces 24 and 25 which, as shown, are provided with spherically concave pole faces, the area of each face preferably being as nearly hemispherical as practical considerations will permit. Although the pole pieces 24 and 25 are illustrated as separate members suitably secured to the magnetic members 15a, 15b it will of course be understood that these pole pieces may be formed integrally with the members 15a, 15b if desired.

The armature member 23 is mounted on a shaft 26 which is suitably journaled in upper and lower bearing members 27 and 28 secured centrally thereof to the upper and lower arms 29 and 30 of the member 14. The axis of the shaft 26 is normally vertical although its position will vary somewhat with angular variation in the position of the airplane or support. It is rotated by a suitable driving means which I have shown, for the purposes of illustration, as a small wind turbine 31 attached to the supporting plate 10. This turbine comprises a driving wheel 32 secured to the upper end of the shaft 26 and enclosed in a casing 33. A jet of air is directed against the periphery of the wheel 32, which is suitably serrated, by means of a nozzle 34 which connects with the slip stream by a hose or pipe connection (not shown), the air escaping from the casing through an outlet orifice 35. The escaping air is preferably conducted to the exterior of the airplane by means of a discharge pipe (not shown) which may be connected with the orifice 35 by means of the pipe coupling 35a. It should be understood that any suitable driving means such for example as a small electric motor or an impeller located in the slip stream may be employed in place of the wind turbine.

The armature member 23 as well as the members 15a and 15b may be made of any suitable ferro-magnetic material, such for example as the alloy known to the trade as permalloy consisting approximately of 78½% nickel and 21½% iron, and it is provided with a winding 36 having a large number of turns whereby an electromotive force is induced in the coil when the coil is rotated and a magnetic flux is supplied thereto by the pole pieces. The armature member 23 is preferably spherical in form so that a substantially uniform air gap will be maintained with respect to the pole pieces 24 and 25 regardless of the angle its axis may take with the longitudinal axis of the ferro-magnetic member 15 upon relative movement of the elongated member in its bearings 20 and 21.

The terminals of the winding 36 are brought out to segments of commutator 37 which is mounted on the shaft 26 and rotated with it and the terminals of a galvanometer 52 constituting an indicating device are connected to the brushes 38, 38a which cooperate with the commutator 37. It will be understood that the magnitude of the voltage at the brushes is determined by the angle that the brush axis makes with the flux crossing the air gap. The brushes are preferably set for the position of maximum voltage since this will provide a compass of maximum sensitivity. A pendulum 39 (see Fig. 6) attached to pivot 18 serves to stabilize the longitudinal axis of the ferro-magnetic member 15 in a horizontal plane when the airplane tips, and a dash pot 40 is provided in connection with the pivot 19 to damp out any motion that may be imparted to the member. It will be realized, of course, that I may use any other suitable stabilizing means in place of the pendulum 39 such for example as a gyroscope.

As previously noted, the ferro-magnetic member 15 has an enlarged central portion, i. e., it is provided with enlarged pole pieces 24 and 25, and the construction is such that the winding 36 of armature 23 is to a considerable extent surrounded by this enlarged portion and thus effectually screened from all direct effect of the earth's magnetic field. It will be understood from the above description that for any setting of the mechanical course setting device 13, the ferro-magnetic member 15 is constrained to move with the airplane about a normally vertical axis and is stabilized in a horizontal plane when the airplane rocks or tips. When the airplane is on its chosen course, the ferro-magnetic member 15 is adapted to lie with its longitudinal axis in a plane perpendicular to the meridian i. e., the direction of the horizontal component of the earth's magnetic field and this longitudinal axis is further stabilized in a horizontal plane. When in this position, no magnetic flux will cross the air gap because the ferro-magnetic member 15 is perpendicular to both the vertical and horizontal components of the earth's field. If the longitudinal axis of the ferro-magnetic member deviates from the plane perpendicular to the meridian of the earth's field, magnetic flux will be induced in the ferro-magnetic member, the density of which will be proportional to the sine of the angle that the member makes with the meridian of the earth's field. The ferro-magnetic member 15 is preferably made of a material having high permeability, low retentivity or coercive force and practically no hysteresis. Although several materials meet these requirements, I prefer to use an alloy known to the trade as permalloy and consisting roughly of 78½% nickel and 21½% iron. The density of the flux induced in the ferro-magnetic member by a large homogeneous magnetic field will increase in value with increasing lengths of the ferro-magnetic member 15, as is well understood by those skilled in the art. While no particular length is essential to the operation of this device, I prefer to make the ferro-magnetic member 15 of a length calculated to give the maximum sensitivity consistent with the space available for its installation.

It is to be noted that the longitudinal axis of the ferro-magnetic member 15, its transverse longitudinal axis of rotation defined by the pivots 18 and 19, and the axis of rotation of the armature member 23 all intersect each other in a point.

In operation, the ferro-magnetic member 15 is rotated about a vertical axis by the mechanical course setting means 13 until it occupies such a position with respect to the body of the airplane that its longitudinal axis will lie in an east-west plane perpendicular to the meridian of the earth's magnetic field when the airplane is pointed in the desired direction. The armature member 23 is rotated in the air gap by the wind turbine at a suitable speed which is preferably substantially constant. As long as the airplane adheres to the chosen course, no flux will be induced in the ferro-magnetic member 15 by the earth's field and, therefore, no electromotive force will be induced in the armature winding 36 and the galvanometer will read zero to indicate that the airplane is on the desired course. Assume now, for example, that the chosen course is due north and that the airplane deviates slightly from its course in an easterly direction. Then the ferromagnetic member 15 will be moved a corresponding amount from an east-west plane and a magnetic flux proportional to the sine of the angle of deviation will be induced therein by the earth's field. The direction of the flux will be from left to right in the ferro-magnetic member and an electromotive force proportional to the flux induced in member 15 will be induced in the winding 36 and the galvanometer needle will be deflected from its central or neutral position by an amount proportional to the induced e. m. f. thereby indicating that the airplane is off its course. The direction of the deflection will indicate the direction of deviation of the airplane. The pilot then steers the airplane in a direction to bring the galvanometer needle back to zero when the airplane will be again proceeding in the desired direction. Had the airplane deviated from its course in a westerly direction, the induced flux would have taken the opposite direction through the ferro-magnetic member and the induced electromotive force in the winding, and the galvanometer deflection would likewise have been in the reverse direction. Thus, the pilot is apprised of the direction that he must steer the airplane to bring it back on its true course.

It will thus be clear that the deflection of the needle of the galvanometer 52 is a measure of the flux induced in the ferro-magnetic member 15 and, therefore, a measure of the angle by which the member 15 is caused to deviate from its normal east-west position when the airplane upon which it is mounted deviates from the set course. The galvanometer 52 may be provided with a co-operating dial calibrated to read directly the number of degrees by which the airplane deviates from its course.

It will have been observed that the zero reading of the galvanometer is absolutely independent of the brush position since the brushes, once they have been set, always occupy the same relative position with respect to the axis of the induced flux. Obviously then this device is free from errors due to brush imperfections, unevenness in their wear and slight relative movement of the brush axis with respect to the field. It will also have been observed that the driving means 31 and the armature member 23 are directly connected by the same shaft thus obviating the necessity for a flexible coupling and its attendant disadvantages.

In the modification shown in Fig. 5, the mounting for the ferro-magnetic member 15 is the same as in Figs. 1 and 2. In place of the armature member 23 a compass needle 41 is mounted in the air gap and is biased to a position at right angles with the longitudinal axis of the ferro-magnetic member 15 by a delicate spring 42. When the member 15 is turned, as for example when the airplane departs from its chosen course, a magnetic flux is induced in the ferro-magnetic member which crosses the air gap as before and the compass needle is deflected from its normal position against the restoring force of the spring 42 thus indicating that the airplane has deviated from its predetermined course. The operation is in all other respects similar to that in Figs. 1 and 2.

Although I have described my invention with particular reference to a compass wherein the indications are made with respect to the meridian or direction of the earth's magnetic field, it will, of course, be understood that my invention may be utilized in connection with any suitable magnetic field with respect to which certain indications are desired. While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention or the scope of the annexed claims.

What I claim as new and desire to secure by Letters Patent of the United States is:

1. In a device for indicating the angular relation between the course of a moving body and the earth's magnetic field, a magnetic member provided with an air gap intermediate its ends, means mounting said member on the body for rotation with respect to the body about a horizontal axis and causing said member to move with the body about a vertical axis and means located in said air gap responsive to the magnetic flux induced in said member by the earth's magnetic field.

2. An electromagnetic compass for aircraft and the like subject to motion about an axis thereof, comprising an armature, means mounting said armature for rotation about an axis at an angle to said first named axis and fixed with respect to said craft, a magnetic member, means mounting said member on said craft in cooperative relationship with said armature so that said member directs the earth's magnetic field into said armature, means for stabilizing said member in a predetermined plane so as to provide for relative motion between said armature and said member upon movement of said craft about said axis of said craft, and means for rotating said member relative to said craft to a predetermined position in said plane and for securing said member in said predetermined position.

3. An electromagnetic compass comprising an armature arranged for rotation in the earth's magnetic field, a magnetic member having relatively high permeability and relatively low retentivity, and means mounting said member in cooperative relationship with said armature so that said member directs the earth's magnetic field into said armature, means for mounting said member on a craft subject to motion about an axis thereof, and means for stabilizing said magnetic member in a predetermined plane whereby said member is stabilized about said axis.

4. An electromagnetic compass comprising an armature, an elongated magnetic member for intensifying the effect of the earth's magnetic field, and means mounting said member in cooperative relationship with said armature so that said member directs into said armature a magnetic flux proportional to the angular relationship between the longitudinal axis of said member and an axis of the earth's field, means for rotating said armature so that a voltage is generated therein proportional to said flux, and indicating means responsive to said voltage for indicating the angular relationship between the longitudinal axis of said member and said axis of the earth's field.

5. An electromagnetic compass comprising an armature, means for mounting said armature on a body subject to motion about an horizontal axis for rotation about an axis fixed with respect to said body, means for rotating said armature, an elongated magnetic member for intensifying the effect of the earth's magnetic field, means for mounting said member in cooperative relationship with said armature so that said member directs the earth's magnetic field into said armature, said last mentioned mounting means providing relative movement between said armature and said member upon movement of said body about said horizontal axis, and means for stabilizing said member about said axis.

6. An electromagnetic compass comprising an armature, means for rotating said armature, a magnetic member, means mounting said member in cooperative relationship with said armature so that said member directs into said armature a magnetic flux determined by the angular relationship between an axis of said member and an axis of a component of the earth's magnetic field, and said member including a magnetic structure mounted in cooperative relationship with said armature and surrounding a substantial portion thereof for shielding said armature from other components of the earth's magnetic field.

7. An electromagnetic compass for an aircraft and the like comprising an armature means mounting said armature on said craft for rotation about a normally vertical axis, a pair of magnetic members arranged on opposite sides of said armature and extending in opposite directions therefrom, means mounting said members in a horizontal plane with an end of each adjacent said armature so that said members direct the earth's magnetic field into said armature, and manually operated means for rotating said members in said horizontal plane to a desired position with respect to a predetermined axis of said craft.

8. An electromagnetic compass comprising an armature, means for rotating said armature, means including a pair of elongated magnetic members arranged end to end on opposite sides of said armature for controlling the effect of the earth's magnetic field on said armature, and means for stabilizing said members in a predetermined plane.

9. An electromagnetic instrument comprising an armature, a support for said armature, means for rotating said armature, means including a pair of elongated magnetic members adjustably mounted on said support in alinement for directing the earth's magnetic field into said armature, and means for maintaining said magnetic members in a horizontal plane.

10. An electromagnetic compass for indicating the angular relation of the course of a moving body with respect to the meridian of the earth's magnetic field comprising an elongated ferro-magnetic member adapted to have flux induced therein by the earth's field and provided with an air gap intermediate its extremities an armature rotatably mounted in said air gap, means for rotating said armature so that a voltage proportional to said flux is induced therein, and indicating means responsive to said voltage for indicating the magnetic condition in said air gap.

11. In a device for indicating the angular relation existent between the course of a moving body and the meridian of the earth's magnetic field, a ferro-magnetic member provided with an air gap intermediate its ends, means mounting said member for relative rotation with respect to said body about a horizontal axis, means for rotating said member about a predetermined axis and for securing said member in a predetermined angular position with respect to said body so that said member is movable with said body about a vertical axis, and means located in the air gap for indicating the condition in the ferro-magnetic member as to existence or non-existence of flux induced therein by the earth's magnetic field.

12. Means for indicating the angular position of a body with respect to the meridian of the earth's magnetic field including an elongated ferro-magnetic member having its magnetic circuit interrupted to form an opening, means mounting said member for relative rotation with respect to said body about an axis parallel to the north-south meridian of the field when its longitudinal axis is in an east-west plane, and means comprising an electromagnetic device located within said opening and an indicating device connected to said electromagnetic device for measuring the density of the flux in said opening when the longitudinal axis deviates from the east-west plane.

13. Apparatus for determining the relative position of a body with respect to a magnetic field including an elongated ferro-magnetic member, means mounting said member on said body and providing for relative rotation with respect thereto about a transverse axis of said member, means for stabilizing the longitudinal axis of the member in a horizontal plane and means for indicating the presence of flux in said member when the longitudinal axis of the member deviates from a plane perpendicular to the magnetic field.

14. An electromagnetic compass comprising a rotatably mounted armature, a pair of magnetic members arranged end to end on opposite sides of said armature, means mounting said members with an end of each of said members adjacent said armature, means for stabilizing said members in a horizontal plane so that a magnetic flux is induced therein by the horizontal component of the earth's magnetic field and directed into said armature, and means comprising pole pieces formed on the ends of said magnetic members adjacent said armature and shielding a substantial portion of said armature from other components of the earth's magnetic field.

15. A compass for an aircraft and the like subject to motion about an horizontal axis thereof comprising an armature, means mounting said armature for rotation about an axis fixed with respect to said craft a pair of magnetic members arranged end to end on opposite sides of said armature, means for stabilizing said members in a horizontal plane, means for mounting said members on said craft in cooperative relationship with said armature so that said members direct into said armature a magnetic flux proportional to the angular relationship between the axis of said members and an axis of the earth's magnetic field, and means for orienting said members in said plane to adjust the angular relationship between the magnetic axes of said members and a predetermined axis of said craft.

16. A compass for indicating the angular relationship between an axis of a body and the meridian of the earth's magnetic field comprising a rotatably mounted armature, a magnetic member, means mounting said member on said body in cooperative relationship with said armature so that said member directs into said armature a magnetic flux dependent upon the angular position of said member relative to said meridian of the earth's magnetic field, means for rotating said armature so that a voltage determined by said flux is induced therein, an electro-responsive device connected to said armature, and means for adjusting the angular position of said magnetic member relative to said body whereby for each position a predetermined indication of said indicating device corresponds to a predetermined angular relationship between an axis of said body and said meridian of the earth's magnetic field.

In witness whereof, I have hereunto set my hand this 17th day of November, 1928.

JAMES D. TEAR.

DISCLAIMER 1,863,421.—*James D. Tear*, Schenectady, N. Y. ELECTROMAGNETIC COMPASS. Patent dated June 14, 1932. Disclaimer filed May 16, 1935, by the assignee, *General Electric Company*.

Hereby enters the following disclaimer to claims 3, 6, 7, 8, and 9 of the said Letters Patent, which are in the following words, to wit:

"3. An electromagnetic compass comprising an armature arranged for rotation in the earth's magnetic field, a magnetic member having relatively high permeability and relatively low retentivity, and means mounting said member in cooperative relationship with said armature so that said member directs the earth's magnetic field into said armature, means for mounting said member on a craft subject to motion about an axis thereof and means for stabilizing said magnetic member in a predetermined plane whereby said member is stabilized about said axis.".

"6. An electromagnetic compass comprising an armature, means for rotating said armature, a magnetic member, means mounting said member in cooperative relationship with said armature so that said member directs into said armature a magnetic flux determined by the angular relationship between an axis of said member and an axis of a component of the earth's magnetic field, and said member including a magnetic structure mounted in cooperative relationship with said armature and surrounding a substantial portion thereof for shielding said armature from other components of the earth's magnetic field.

"7. An electromagnetic compass for an aircraft and the like comprising an armature means mounting said armature on said craft for rotation about a normally vertical axis, a pair of magnetic members arranged on opposite sides of said armature and extending in opposite directions therefrom, means mounting said members in a horizontal plane with an end of each adjacent said armature so that said members direct the earth's magnetic field into said armature, and manually operated means for rotating said members in said horizontal plane to a desired position with respect to a predetermined axis of said craft.

"8. An electromagnetic compass comprising an armature, means for rotating said armature, means including a pair of elongated magnetic members arranged end to end on opposite sides of said armature for controlling the effect of the earth's magnetic field on said armature, and means for stabilizing said members in a predetermined plane.

"9. An electromagnetic instrument comprising an armature, a support for said armature, means for rotating said armature, means including a pair of elongated magnetic members adjustably mounted on said support in alinement for directing the earth's magnetic field into said armature, and means for maintaining said magnetic members in a horizontal plane."

[*Official Gazette June 4, 1935.*]